United States Patent [19]

Matsui et al.

[11] Patent Number: 4,542,112

[45] Date of Patent: Sep. 17, 1985

[54] METHOD FOR PRODUCING SPINEL FINE POWDERS

[75] Inventors: Minoru Matsui; Tomonori Takahashi, both of Nagoya, Japan

[73] Assignee: NGK Insulators, Ltd., Japan

[21] Appl. No.: 460,912

[22] Filed: Jan. 25, 1983

[30] Foreign Application Priority Data

Oct. 21, 1982 [JP] Japan .................................. 57-184817

[51] Int. Cl.[4] .......................... C04B 35/04; C01F 7/16
[52] U.S. Cl. ...................................... 501/120; 423/600
[58] Field of Search .......................... 423/600; 501/120

[56] References Cited

U.S. PATENT DOCUMENTS

| 3,413,083 | 11/1968 | Daendliker | 423/600 |
| 3,510,272 | 5/1970 | Schmank et al. | 423/600 |
| 3,786,137 | 1/1974 | Thomas | 423/600 |
| 3,903,122 | 9/1975 | Thomas | 423/600 |
| 4,273,587 | 6/1981 | Oda et al. | 423/600 |
| 4,400,431 | 8/1983 | Henslee et al. | 423/600 |

OTHER PUBLICATIONS

Hackh's Chemical Dictionary, McGraw-Hill Book Co., N.Y., 1969, pp. 623, 630.

Cotton et al., "Advanced Inorganic Chemistry", Interscience Pub., N.Y., 1974, pp. 54–55.

Primary Examiner—H. T. Carter
Attorney, Agent, or Firm—Parkhurst & Oliff

[57] ABSTRACT

Spinel fine powders having high purity suitable for raw materials for producing a dense and uniform spinel sintered body, are produced by hydrolyzing an alcohol solution of specifically defined magnesium alkoxides and aluminum alkoxides in a specific mixing ratio.

14 Claims, No Drawings

METHOD FOR PRODUCING SPINEL FINE POWDERS

BACKGROUND OF THE INVENTION

1. Field of the Invention

The present invention relates to a method for producing spinel fine powders having high purity.

The fine powders consisting of a single phase of spinel solid solution composed of aluminum and magnesium oxides shown by the following general formula $$MgO \cdot xAl_2O_3$$

wherein x is 1–1.5, are useful as the raw material for producing dense and uniform spinel sintered bodies, such as transparent spinel sintered bodies and the like.

2. Description of the Prior Art

The following prior methods have been proposed for producing such spinal fine powders.

(1) Producing spinel through a solid phase reaction of aluminum oxide with magnesium oxide wherein the formed spinel is pulverized.

(2) Forming a mixture of an aluminum salt and a magnesium salt that is subjected to pyrolysis.

(3) Adjusting the pH of an aqueous solution of an aluminum salt and a magnesium salt to cause co-precipitation.

However, the above described solid phase reaction method (1) is apt to cause unevenness in the composition of the formed phase and it is difficult to obtain fine powders having a uniform composition. Furthermore, the activity of the particles is lowered due to treatment at high temperature, and sintering of the formed powders is difficult.

The above described salt decomposition method (2) has a drawback in that anions remain in the formed fine powders as an impurity.

The above described co-precipitation method (3) has a drawback in that the adjustment of pH is difficult and it is impossible accurately to control the composition.

It has been known in the sintering of spinel, to add a slight amount of LiF in order to promote densification at low temperature, but the addition and dispersion of LiF has been heretofore carried out through mixing by means of a ballmill, with a result that the dispersion cannot be satisfactorily effected and nonuniformity is caused in the sintered body.

SUMMARY OF THE INVENTION

The method for producing spinel fine powders of the present invention obviates the drawbacks and problems of these prior methods. The present invention lies in a method for producing spinel fine powders in which 1 mole of magnesium alkoxide shown by the general formula $$Mg(OR)_2$$

wherein R is an alkyl group having 1–3 carbon atoms and 2–3 moles of aluminum alkoxide shown by the general formula $$Al(OR')_3$$

wherein R' is an alkyl group having 1–3 carbon atoms, are dissolved in an alcohol shown by the general formula $$R''OH$$

wherein R'' is an alkyl group having 1–3 carbon atoms. The precipitates formed by hydrolysis of the solution are heated to form fine powders of solid solution of spinel oxides having high purity.

DESCRIPTION OF THE PREFERRED EMBODIMENTS

The present invention will be explained in more detail hereinafter. 1 mole of magnesium alkoxide shown by the general formula $Mg(OR)_2$ obtained by reacting metallic magnesium with an alcohol, for example, magnesium methoxide, magnesium ethoxide, magnesium isopropoxide and the like and 2–3 moles of aluminum alkoxide shown by the general formula $Al(OR')_3$ obtained by reacting metallic aluminum with an alcohol, for example, aluminum methoxide, aluminum ethoxide, aluminum isopropoxide and the like are thoroughly dissolved in an alcohol shown by the general formula $R''OH$, such as methanol, ethanol, isopropanol and the like by reflux. In this case, it is essential that the alkyl groups of the aluminum alkoxides, magnesium alkoxides, and alcohols contain carbon atoms 1–3. This is because if alkoxides or alcohols having 4 or more carbon atoms are used, water is difficultly dissolved in the alcohol of the solvent or the alcohol generated by the hydrolysis of the alkoxides with water is not rapidly dispersed in the alcohol solution upon hydrolysis or a portion where water is excessive and a portion where water is deficient are locally formed or the properties of the hydrolyzed products are different than other and therefore, the uniform spinel fine powders cannot be obtained.

Furthermore, it is essential that the molar ratio of magnesium alkoxide to aluminum alkoxide is 1:2–3 because when aluminum alkoxide is less than 2 moles based on 1 mole of magnesium alkoxide, a periclase phase is precipitated other than a spinel phase, and when the amount of aluminum alkoxide exceeds 3 moles, an alumina phase is precipitated in addition to a spinel phase and the fine powders of a single phase of solid solution of spinel oxide cannot be obtained. When the alcohol solution is prepared, it is preferable that the combined concentration of aluminum alkoxide and magnesium alkoxide is not greater than 0.2 mol/l. If the sum of concentration is higher than 0.2 mol/l, the alkoxide molecules are readily polymerized in the solution and the mixed state of aluminum alkoxide and magnesium alkoxide in the solution is not uniform and even if the hydrolysis is effected, the uniform spinel fine powders may not be obtained. The aluminum alkoxides and magnesium alkoxides, may be previously synthesized but the synthesis and dissolution of the alkoxides can be concurrently carried out by adding metallic aluminum magnesium alkoxide, or metallic magnesium and aluminum alkoxide into an alcohol. In this case, an unreacted portion or undissolved portion remains and the composition ratio of aluminum alkoxide and magnesium alkoxide in the alcohol solution is not frequently known but in this case, the concentration of aluminum and magnesium is analyzed and the molar ratio is adjusted to the desired value.

Then, water is added to the thus obtained alcohol solution of magnesium alkoxide and aluminum alkoxide and the mixture is preferably heated at the boiling point of the alcohol or at a temperature near the boiling point and is hydrolyzed in a vessel equipped with a reflux apparatus. The hydrolysis in this case is carried out by the following formulae (1).

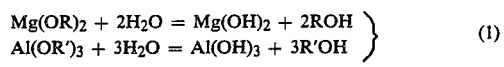

$$Mg(OR)_2 + 2H_2O = Mg(OH)_2 + 2ROH$$
$$Al(OR')_3 + 3H_2O = Al(OH)_3 + 3R'OH \quad (1)$$

As seen from the above formulae (1), it is most preferable that the water necessary for the hydrolysis is in an amount corresponding to the mole number sum of three times as much as the mole number of aluminum alkoxide and twice as much as the mole number of magnesium alkoxide. Because, when the hydrolysis is effected by adding more than this amount of water, hydroxides formed by an excess amount of water are dissolved and when the amount of water is less than this amount, non-precipitated aluminum and magnesium components which are not hydrolyzed, are generated and the composition of spinel fine powders deviates from the aimed composition ratio.

Water to be used in the hydrolysis is preferably diluted with the same kind of alcohol as a solvent for preparing the alcohol solution of the alkoxide, in an amount of 10 times as much as the water in order to produce a uniform precipitate of hydroxides without forming portions where water is locally excessive.

To produce spinel fine powders in which LiF is uniformly dispersed, it is preferred that LiF is dissolved in the water to be used for the hydrolysis and said aqueous solution of LiF is diluted with the same alcohol as the solvent as mentioned above.

The precipitate of hydroxides obtained by the hydrolysis is separated from the alcohol by filtration and the like and dried and heated to crystallize the hydroxides. The drying is preferably effected at a temperature of not higher than 120° C., because when the drying is effected at a temperature of higher than 120° C., the remaining alcohol stuck on the hydroxides is carbonized and the carbon remains in the spinel fine powders as an impurity. The heating is preferably effected at a temperature of higher than 700° C. and lower than 1,200° C. in an oxidizing atmosphere. This is because, in the case of non-oxidizing atmosphere, the remaining alcohol deposited on the hydroxides is carbonized and the carbon may remain in the spinel fine powders as an impurity. The hydroxides obtained through drying are amorphous and are completely dehydrated at 500° C. and the spinel is crystallized at 700° C. Therefore, unless the heating is effected at a temperature of not lower than 700° C., the spinel oxide fine powders cannot be obtained. When the heating is effected at a temperature of higher than 1,200° C., the particles grow and the fine powders suitable for the raw material for producing the sintered body cannot be obtained. The purity of the spinel powders obtained through the method of the present invention is higher than 99.9%.

The following examples are given for the purpose of illustration of this invention and are not intended as limitations thereof.

EXAMPLE

Magnesium alkoxide and aluminum alkoxide described in the following Table 1 were mixed in the molar ratio and the sum of concentration described in Table 1 and dissolved in an alcohol described in Table 1 by using a vessel equipped with a reflux apparatus and to the said alcohol solution was added a solution composed of one volume part of water and ten volume part of alcohol, in which LiF is dissolved as described in Table 1 and the obtained solution was hydrolyzed under the conditions described in Table 1.

The obtained hydroxides were filtered and dried at 110° C. and heated under the condition described in Table 1 to obtain spinel powders Nos. 1-10 according to the present invention.

The crystal phase, specific surface area, purity and the like were measured with respect to the obtained spinel fine powders and are compared with those of the prior samples (Nos. 11 and 12) in Table 1.

TABLE 1

| No. | Aluminum alkoxides | Magnesium alkoxides | Al/Mg (molar ratio) | Sum of concentration (mol/l) | Alcohol | LiF (wt %) | Temperature in hydrolysis (°C.) | Heating condition Temperature (°C.) | Heating condition Time (h) | Crystal phase | Specific surface area (m²/g) | Impurity (ppm) |
|---|---|---|---|---|---|---|---|---|---|---|---|---|
| 1 | Aluminum methoxide | Magnesium methoxide | 2 | 0.1 | Methanol | — | 65 | 800 | 24 | Spinel | 80 | — |
| 2 | Aluminum methoxide | Magnesium methoxide | 2.2 | 0.1 | Methanol | 0.1 | 65 | 800 | 24 | Spinel | 88 | — |
| 3 | Aluminum ethoxide | Magnesium methoxide | 2.2 | 0.05 | Ethanol | — | 78 | 800 | 24 | Spinel | 72 | — |
| 4 | Aluminum ethoxide | Magnesium ethoxide | 2.2 | 0.1 | Ethanol | — | 78 | 800 | 24 | Spinel | 66 | — |
| 5 | Aluminum isopropoxide | Magnesium methoxide | 2.2 | 0.1 | Iso-propanol | 0.1 | 83 | 800 | 24 | Spinel | 80 | — |
| 6 | Aluminum isopropoxide | Magnesium isopropoxide | 2.1 | 0.2 | Iso-propanol | 0.1 | 83 | 1,000 | 12 | Spinel | 73 | Si: 75, Fe: 142, Na: 148 |
| 7 | Aluminum isopropoxide | Magnesium isopropoxide | 2.1 | 0.2 | Iso-propanol | 0.1 | 25 | 1,000 | 12 | Spinel | 65 | — |
| 8 | Aluminum isopropoxide | Magnesium isopropoxide | 2.1 | 0.2 | Iso-propanol | — | 83 | 1,000 | 12 | Spinel | 72 | Si: 83, Fe: 142, Na: 148 |
| 9 | Aluminum isopropoxide | Magnesium isopropoxide | 3.0 | 0.2 | Iso-propanol | 0.1 | 83 | 1,000 | 12 | Spinel | 95 | — |
| 10 | Aluminum isopropoxide | Magnesium isopropoxide | 3.0 | 0.2 | Iso-propanol | — | 83 | 1,000 | 12 | Spinel | 93 | — |
| 11 | Pyrolysis of salt | | 2.1 | | | | | 1,000 | 12 | Spinel | 55 | Si: 47, |

TABLE 1-continued

| No. | Aluminum alkoxides | Magnesium alkoxides | Al/Mg (molar ratio) | Sum of concentration (mol/l) | Alcohol | LiF (wt %) | Temperature in hydrolysis (°C.) | Heating condition Temperature (°C.) | Time (h) | Crystal phase | Specific surface area (m²/g) | Impurity (ppm) |
|---|---|---|---|---|---|---|---|---|---|---|---|---|
| 12 | Pyrolysis of salt | | 3.0 | | | | | 1,000 | 12 | Periclase / Spinel Periclase Corundum | 83 | S: 700, Fe: 142, Na: 297, Ca: 71, K: 166 — |

As seen from the results in Table 1, in the spinel fine powders obtained by the production method according to the present invention, the crystal phase consists of spinel single phase and the specific surface area is larger by 15-55% than that of the prior samples and also no impurities are contained in the formed fine powders or the content of impurities is very slight.

As mentioned above, the method for producing the spinel fine powders of the present invention can provide spinel fine powders having a crystal phase consisting of spinel single phase, a large specific surface area and high purity by hydrolyzing an alcohol solution of the specifically defined magnesium alkoxide and aluminum alkoxide in a specific mixing ratio and the obtained spinel fine powders can be used as the raw materials for producing spinel sintered bodies, such as transparent spinel sintered bodies. Thus, this invention provides a method for producing spinel fine powders, which are very useful as the raw material for ceramics.

What is claimed is:

1. A method for producing spinel fine powders comprising the steps of:
   (a) dissolving 1 mole of magnesium alkoxide of the formula $Mg(OR)_2$ wherein R is an alkyl group having 1-3 carbon atoms, and, from 2.1 to 3 moles of aluminum alkoxide of the formula $Al(OR')_3$ wherein R' is an alkyl group having 1-3 carbon atoms, in an alcohol of the formula $R''OH$ wherein R'' is an alkyl group having 1-3 carbon atoms to form a solution;
   (b) hydrolyzing said solution; and
   (c) heating precipitates formed by said hydrolysis at temperatures from 700° C. to 1200° C. to form fine powders consisting of single-phase spinel-structured solid solutions of oxides of aluminum and magnesium of the formula $MgOxAl_2O_3$ wherein x is from 1.05 to 1.5.

2. The method of claim 1, wherein the combined concentration of aluminum alkoxide and magnesium alkoxide dissolved in said alcohol is not greater than 0.2 mol/l.

3. The method of claim 2, wherein said hydrolysis step is conducted at the boiling point of said alcohol.

4. The method of claim 2, wherein said hydrolysis step is conducted in the presence of LiF.

5. The method of claim 4, wherein said hydrolysis step is conducted at the boiling point of said alcohol.

6. The method of claim 1, wherein said hydrolysis step is conducted in the presence of LiF.

7. The method of claim 6, wherein said hydrolysis step is conducted at the boiling point of said alcohol.

8. The method of claim 1, wherein said hydrolysis step is conducted at the boiling point of said alcohol.

9. The method of claim 1, wherein said hydrolysis step is conducted by adding water to said solution.

10. The method of claim 9, wherein from 8 to 11 moles of water are added to hydrolyze said solution.

11. The method of claim 9, wherein said water is added in an amount corresponding to the mole number sum of three times the mole number of said aluminum alkoxide and two times the mole number of said magnesium alkoxide.

12. The method of claim 9, wherein said water is added in an amount sufficient to hydrolyze all alkoxide groups of said aluminum alkoxide and said magnesium alkoxide.

13. The method of claim 9, wherein said water is diluted with said alcohol.

14. The method of claim 1, wherein said heating step comprises drying said precipitates at not greater than 120° C. and heating said dried precipitates at from 700° C. to 1200° C.

* * * * *